3,016,290
PURIFICATION OF HYDROGEN PEROXIDE
Arthur A. Elston and Wilbie S. Hinegardner, Niagara Falls, N.Y., assignors to E. I. du Pont de Nemours & Company, Wilmington, Del., a corporation of Delaware
No Drawing. Filed Jan. 27, 1956, Ser. No. 561,950
13 Claims. (Cl. 23—207)

This invention relates to a method of purifying hydrogen peroxide and particularly for removing organic impurities from aqueous hydrogen peroxide solutions.

Crude aqueous solutions of hydrogen peroxide obtained by synthesis methods using organic compounds as raw materials, intermediates, solvents or treating agents, invariably contain substantial amounts of organic impurities. Illustrative of such methods are those involving the partial oxidation of a hydrocarbon such as propane or butane, or of an alcohol such as isopropanol; and those employing an alkylanthrahydroquinone or a hydrazo compound as a peroxide-synthesizing intermediate. The organic impurities may be present as residual amounts of the organic raw material, intermediate or solvent employed in the synthesis method, or as reaction products of such compounds. Most of such impurities will usually be removed from the crude product by one or more settling, decantation, extraction, distillation or like operations, but the final aqueous peroxide solution will generally contain dissolved organic impurities in appreciable concentrations which may range up to 100 to 300 or more parts per million (p.p.m.) by weight of the solution.

Organic impurities are also usually present in hydrogen peroxide solutions obtained by methods involving the electrolysis of sulfuric acid or its salts, or by the reaction of metal peroxides with acids. Such impurities may derive from organic impurities in the raw materials used, from organic addition or purifying agents employed, or they may result from accidental contamination.

The presence of organic impurities, even in the relatively small concentrations indicated above, makes the peroxide solution objectionable or even entirely unsuitable for various uses. It would, therefore, be desirable to have a simple practical method for removing such impurities or for effectively reducing their concentration.

It is an object of the invention to provide a simple effective method for removing organic impurities from aqueous hydrogen peroxide solutions. A further object is to provide such a method which is applicable to the removal of such impurities from aqueous solutions of relatively high hydrogen peroxide concentrations. Still further objects will be apparent from the following description.

The objects of the invention are accomplished by intimately contacting an aqueous hydrogen peroxide solution containing dissolved organic impurities with a finely-divided activated carbon under agitation and under non-alkaline conditions to effect adsorption of such impurities on the activated carbon, and then separating the latter from the solution before any substantial peptization of the activated carbon in the solution occurs.

The activated carbon employed should be one which gives a slurry having a pH not exceeding 8, preferably less than 7, when slurried with carbon dioxide-free distilled water at a carbon concentration of 1% by weight of the slurry. Most preferably, the pH will be in the range 4.5 to 6, but activated carbons more acidic can be used. Also, the activated carbon should be one which will not cause excessive decomposition of the peroxide under the conditions of use.

Activated carbons have long been regarded as active peroxide decomposition catalysts and it would have been expected that a more highly activated carbon would decompose hydrogen peroxide more rapidly than a less highly activated carbon. It has now been found, however, that this is not necessarily the case and that some of the most highly activated commercial carbons are best suited for the present purpose and result in insignificant peroxide decomposition when employed under proper conditions. Ordinarily, use of the activated carbon should not result in decomposition of more than about 2% of the peroxide being treated, although somewhat higher losses may be tolerable in some cases. Preferably, the loss will not exceed about 0.5%.

It has been found that the peroxide decomposition loss due to contact with an activated carbon is less when using the carbon in a finely-divided form than when using it in a coarse or granular form. Thus, an activated carbon which effectively removes organic impurities by the present method with relatively little peroxide decomposition when the carbon is used in finely-divided form, causes such high peroxide losses when the carbon is used in a coarse or granular form as to make use of the latter entirely impractical or even dangerous. Ordinarily, the activated carbon should be substantially free of particles larger than about 50 mesh. Preferably, the particles will be as finely-divided as possible while still permitting rapid and complete separation thereof from the treated solution by filtration or equivalent methods. Particles of sizes ranging from 100 to 325 mesh (Tyler standard sieve) or finer are generally suitable. Use of an inert filter aid along with the activated carbon may permit employing the latter in a more finely-divided form than would otherwise be practical.

The preferred activated carbons are the commercially available, finely-divided, activated, acid-treated, and washed, activated carbons derived from wood or wood products such as sawdust, or from the residues of wood pulping waste liquors, e.g. sulfite process liquors. Other highly activated carbons which do not cause excessive peroxide decomposition can be used.

The treatment of the peroxide solution with the activated carbon should be effected under agitation and under non-alkaline conditions, i.e., the mixture of the solution and the carbon should be agitated and should have a pH not greater than 7. Preferably, the pH of the mixture will not differ by more than 2 pH units (either above or below) from that pH which corresponds to the equivalence point (as defined in Elston U.S. Patent 2,497,814) of a pure aqueous solution of the same $H_2O_2$ concentration, since these conditions minimize peroxide decomposition and enhance adsorption of the organic impurities. Most preferably, the pH will be within 1 pH unit of the pH representing the equivalence point. More acidic conditions can also be used but usually offer no added advantages.

The time of contact between the finely-divided activated carbon and the peroxide solution is important. Some activated carbons adsorb the organic impurities very rapidly with maximum adsorption being reached within 1 to 4 minutes. Others having substantially the same adsorption capacity for the impurities require more than an hour to reach maximum adsorption. It has been found that the optimum contact time substantially the time required to achieve maximum adsorption of the impurities. Since this time varies widely for different activated carbons, the optimum time for any given carbon must be determined by actual test.

Contact between the activated carbon and the peroxide solutions for a time longer than about 2 to 3 times that required to achieve maximum adsorption of impurities should be avoided, particularly when treating relatively concentrated peroxide solutions, e.g. solutions of greater than about 20% strength. It has been found that if a longer contact time is employed such peroxide solutions actively peptize the carbon particles to give colloidal carbon particles which are difficult to separate completely from the solution. Furthermore, the adsorbed organic impurities tend to become desorbed during such peptization so that the total carbon content (including colloidal carbon) of a solution which has been in contact too long with the activated carbon may exceed that of the original solution. Fortunately, it has been found that such undesirable peptizing action can be substantially completely avoided by avoiding contact times substantially longer than 2 to 3 times that required for maximum adsorption of impurities. Peptization does not occur to any substantial extent until after maximum impurity adsorption results. It is, therefore, most preferred that the activated carbon be rapidly and completely separated from the solution as soon as maximum adsorption has been reached.

The amount of any given activated carbon to be used will depend chiefly upon its adsorptive capacity, the amount of impurities in the solution to be treated, the degree of purification desired and the time and temperature of the treatment. Generally, the amount will not exceed about 2% of the weight of the solution. Most generally, it will range from about 0.1 to 1.0%. For any given activated carbon, the concentration of organic impurities remaining in the treated solution appears to vary inversely and linearly with the logarithm of the amount of activated carbon used over the range up to about 1% of the latter. Multiple treatments with the activated carbon may be desirable when treating solutions containing relatively high concentrations of impurities or when a product especially low in organic impurities is desired.

It is generally desirable to control the temperature of the activated carbon-solution mixture during the treatment since both adsorption of the impurities and decomposition of the peroxide are influenced by temperature. Temperatures above about 40° C. are best avoided to prevent excessive peroxide decomposition. Temperatures not higher than 35° C. are preferred. The most preferred temperatures range from about 21 to 30° C. Temperatures considerably below about 21° C. can be used but are not preferred since they reduce substantially the rate of adsorption of the organic impurities. Optimum balance between the stability of the peroxide solution and the rate of impurity adsorption generally will occur at temperatures within the range of about 21 to 30° C.

The invention is illustrated by the following examples in which all percentages and parts are by weight, unless indicated to be otherwise. All values expressed as parts per million (p.p.m.) are based upon the weight of the peroxide solution.

Example 1

The solution treated was an impure aqueous solution containing 35% $H_2O_2$ and organic impurities equal to 120 p.p.m., calculated as carbon. It had a pH in the range 2.0–2.5, a slight yellow tint, a slight organic odor, and a surface tension of 67.4 dynes/cm. (as compared with values of 73.2 and 72.0 dynes/cm., respectively, for a pure aqueous solution of the same hydrogen peroxide concentration and for pure water). The organic impurities consisted chiefly of aliphatic carbonyl and carboxyl compounds, and hydroperoxides of up to 9 carbon atoms, with traces of aromatic compounds.

The activated adsorbent carbon selected for treating the above solution was a finely-divided (about 100 to 300 mesh), bulky, relatively soft, acid-treated, washed, commercial activated carbon prepared from the residue of sulfite waste liquor obtained in the manufacture of sulfite wood pulp. A 1% slurry of the carbon in carbon dioxide-free distilled water had a pH of about 5.6. In a preliminary test of the carbon, it was found that the peroxide decomposition loss when 0.5 g. of the carbon was suspended under agitation in 100 ml. of the peroxide solution for 5 minutes at room temperature, did not exceed 0.4% of the hydrogen peroxide originally present.

One part of the above activated carbon was slurried with 200 parts by weight of the above peroxide solution. The slurry was agitated for 5 minutes at room temperature (24 to 26° C.), then rapidly filtered through a fine filter medium with the aid of vacuum. The $H_2O_2$ content of the filtered solution was about 34.86%. It contained organic impurities equivalent to only 10 p.p.m. of carbon, representing an organic impurity reduction of 92%. It was clear, colorless and odorless and its surface tension was 73.7 dynes/cm.

Example 2

The procedure of Example 1 was repeated except that a different activated carbon was used and the time of contact with the peroxide solution was 80 minutes. The activated carbon was a less dense, harder, acid-treated, washed, commercial activated carbon of about 100 to 325 mesh size derived from a hardwood charcoal. A 1% slurry thereof in carbon dioxide-free distilled water had a pH of about 4.8. The peroxide decomposition loss when 0.5 g. of the carbon was slurried with 100 ml. of the 35% peroxide solution for 80 minutes at room temperature did not exceed 0.5% of the hydrogen peroxide originally present.

The filtered purified peroxide solution contained organic impurities equivalent to only 15 p.p.m. of carbon. It was clear, colorless and odorless and its surface tension was 73.4 dynes/cm.

Example 3

The general procedure of Example 1 was repeated in treating portions of an aqueous 35% hydrogen peroxide solution of the same type but containing organic impurities equivalent to 95 p.p.m. of carbon. The activated carbon was from the same stock as that of Example 1. The contact time for each treatment was 3 minutes at 25° C., and the amount of activated carbon used varied from 0.1 to 0.9%. The results are shown in the following tabulation:

| Percent Activated Carbon Used | Org. Impurities in Treated Solution in p.p.m. of Carbon |
|---|---|
| 0.1 | 48 |
| 0.3 | 32 |
| 0.5 | 25 |
| 0.7 | 19 |
| 0.9 | 17 |

These results show that the concentration (in p.p.m. of carbon) of organic impurities in the treated solution varies inversely and linearly with respect to the logarithm of the amount up to about 1% (in percent, based on the weight of solution) of activated carbon used.

Example 4

A series of treatments was carried out as generally described in Example 1 employing portions of a peroxide solution from the same stock as that of Example 3 and activated carbon from the same stock as that of Example 1. In this case, however, the amount of activated carbon used (0.5%) remained constant but the treatment time was varied from 1 to 12 minutes at 25° C. The following results were obtained.

| Treatment Time, In Minutes | Org. Impurities in Treated Solution in p.p.m. of carbon |
| --- | --- |
| 1 | 29 |
| 2 | 23 |
| 3 | 22 |
| 4 | 23 |
| 8 | 31 |
| 12 | 43 |

These results show that essentially maximum removal of impurities is accomplished in 2 to 4 minutes using 0.5% of the activated carbon.

Example 5

A series of treatments was carried out similar to those of Examples 3 and 4, except that in this instance the amount of activated carbon used (0.5%) and the time (3 min.) were constant but the treating temperature ranged from 20 to 35° C. The following results were obtained:

| Treatment Temp., ° C. | Org. Impurities in Treated Solution in p.p.m. of Carbon |
| --- | --- |
| 20 | 34 |
| 22.5 | [1] 25 |
| 25.0 | [1] 22 |
| 30.0 | [2] 26 |
| 35.0 | [1] 25 |

[1] Average for duplicate experiments.
[2] Average for triplicate experiments.

These results show that removal of impurities is not as effective at 20° C. as at the higher temperatures. Although impurity removal is effective at 35° C., such a temperature (or higher) is not preferred because of the higher rate of peroxide decomposition at such higher temperatures.

Example 6

A portion of the crude hydrogen peroxide solution described in Example 1 was treated in two stages with activated carbon similar to that of Example 1 but from a different stock supply. In a preliminary test, the peroxide loss when the peroxide solution was contacted with 0.5% of the activated carbon for 5 minutes at 25° C. was 0.5% of the peroxide originally present.

The treatment in each of the two stages followed generally the procedure of Example 1, except that only 0.1% of the activated carbon was used and the treatment time was only 1 minute at 25° C. The organic impurities in the solution after the first and second treatments, respectively, were equivalent to 43 and 16 p.p.m. of carbon.

Example 7

A crude aqueous hydrogen peroxide solution (about 35% strength) obtained by an alkylanthrahydroquinone synthesis method was treated in this example employing an activated carbon from the same stock as that for the carbon of Example 6. The crude solution had a slightly yellow color and a pronounced organic odor and contained organic impurities equivalent to 225 p.p.m. of carbon.

The solution was treated under agitation with 0.5% of the activated carbon for 4 minutes at 25 to 27° C. The bulk of the treating carbon was then removed by filtering the solution rapidly through a filter paper of medium retentivity, following which the solution was filtered through an ultra fine glass frit filter plate. The resulting solution was crystal clear, colorless and odorless, and contained organic impurities equivalent to 80 p.p.m. carbon.

Example 8

A peroxide solution similar to that of Example 7 and containing organic impurities equal to about 155 p.p.m. of carbon, was distilled, then subjected to a treatment with activated carbon as described in Example 7. The organic impurity content of the final treated solution was equal to 28 p.p.m. of carbon, representing about an 82% reduction. When the predistillation step was omitted, the treatment with activated carbon effected removal of only about 50% of the organic impurities. These results show that distillation of the peroxide solution before treating it with the activated carbon is beneficial.

Example 9

A sample of a peroxide solution similar to that of Example 7 and containing organic impurities equal to 145 p.p.m. of carbon was treated as described in Example 7, whereby the organic impurities were reduced to the equivalent of 32 p.p.m. of carbon. A second sample of the solution was allowed to stand 3 months at room temperature, at the end of which time its impurity content had dropped to the equivalent of 128 p.p.m. of carbon. Treatment of the stored sample with activated carbon under the same conditions as for the first sample further reduced its impurity content to the equivalent of 23 p.p.m. of carbon. These results show that it is beneficial to age the solution before treating it with activated carbon.

Further experiments have shown that the presence in the peroxide solution of agents such as phosphates, sodium stannate and ammonium nitrate in the amounts such materials are added for stabilizing and other purposes, does not significantly alter the effectiveness of the present treatment with activated carbon. The presence of inorganic stabilizers may be desirable when relatively unstable solutions are to be treated.

Example 10

A 35% hydrogen peroxide solution obtained by a method involving the electrolysis of sulfuric acid and containing organic impurities equal to 35 p.p.m. of carbon was treated under agitation at 25° C. for 3 minutes with about 0.5% of an activated carbon from the same stock as that of Example 1. The activated carbon was then filtered from the solution to give a filtrate containing organic impurities equal to 20 p.p.m. of carbon.

In all of the foregoing examples, the pH of the mixture of the activated carbon and the peroxide solution was within the range of about 2.0 to 4.1. Preferably, the pH of the mixture will be within 2 pH units (most preferably within 1 pH unit) of the pH representing the equivalence point of the peroxide solution. For peroxide solutions of 35%, 50% and 70% strength, the pH values representing the equivalence points are, respectively, about 3.6, 2.7 and 1.5.

The present method is effective in removing organic impurities from either dilute or concentrated hydrogen peroxide solutions. Most generally it will be applied to solutions containing more than about 10% $H_2O_2$. It has been applied successfully to solutions containing as high as 70% $H_2O_2$ but is most preferably applied to solutions of from 30 to 55% of strength. If the organic impurity content of the solution to be treated is relatively high, e.g., in excess of 100 to 300 p.p.m. (as carbon), it will often be advantageous to reduce the impurity content by preliminary extraction, aeration, distillation, aging or similar treatments, and then to apply the present treatment with activated carbon.

The mixture of hydrogen peroxide solution and finely-divided activated carbon is agitated, e.g. by means of a stirrer or equivalent means, to increase the effectiveness of the contact between the carbon and the solution during the treatment and to avoid excessive decomposition of the peroxide during the contact period. When contact between the solution and the carbon is terminated by separating the carbon, e.g., by filtration, the separated carbon wet with the peroxide solution should be promptly washed with water to prevent any tendency it may have to ignite on standing.

I claim:

1. The method of removing organic impurities from an aqueous hydrogen peroxide solution comprising intimately contacting said solution under agitation and under non-alkaline conditions at a temperature not exceeding 40° C. with a finely-divided activated carbon from the group consisting of activated carbons from wood charcoal and from wood pulping waste liquors, then separating the activated carbon with adsorbed organic impurities from the solution before substantial peptization of said carbon in said solution occurs, said activated carbon being one which does not decompose more than about 2% of the hydrogen peroxide under the conditions of use and one which, when slurried at a 1% concentration in carbon dioxide-free distilled water, gives a slurry having a pH not exceeding 8.

2. The method of removing organic impurities from an aqueous hydrogen peroxide solution comprising agitating at a temperature not exceeding 40° C. a non-alkaline mixture of said solution and a finely-divided activated carbon from the group consisting of activated carbons from wood charcoal and from the residues of wood pulping waste liquors, then separating said activated carbon with adsorbed organic impurities from said solution, said separation being effected after said activated carbon has been in contact with said solution for at least 1 minute but not longer than 80 minutes and before substantial peptization of said activated carbon in said solution occurs, said activated carbon being one which does not decompose more than about 2% of the hydrogen peroxide under the conditions of use and one which, when slurried at a 1% concentration in carbon dioxide-free distilled water, gives a slurry having a pH not exceeding 8.

3. The method of claim 2 wherein the temperature does not exceed 35° C. and the mixture of the hydrogen peroxide solution and the activated carbon has a pH within 2 pH units of the pH representing the equivalence point of the hydrogen peroxide solution being treated.

4. The method of claim 2 wherein the temperature is within the range of 21 to 30° C.

5. The method of claim 2 wherein the mixture of the activated carbon and the hydrogen peroxide solution has a pH within 1 pH unit of the pH representing the equivalence point of the solution.

6. The method of claim 2 wherein the activated carbon is from wood charcoal.

7. The method of claim 2 wherein the activated carbon is one derived from the residues of wood pulping waste liquors.

8. The method of claim 2 employing not more than 2% of the activated carbon, based upon the weight of the solution.

9. The method of claim 2 employing 0.1 to about 1.0% of the activated carbon, based upon the weight of the solution.

10. The method of claim 2 employing an activated carbon essentially free of particles of a size greater than 50 mesh.

11. The method of claim 10, employing not more than 2% of the activated carbon, based on the weight of the solution.

12. The method of claim 2 employing an activated carbon of particle size ranging from 100 to 325 mesh.

13. The method of claim 12, employing not over 2% of the activated carbon, based on the weight of the solution.

References Cited in the file of this patent

UNITED STATES PATENTS 2,035,101     Soule _____ Mar. 24, 1936

OTHER REFERENCES

Cantino: "Industrial and Engineering Chemistry, Analytical Edition," vol. 16, pages 181–182 (1944).

Mantell: "Industrial Carbon," 2nd Edition, 1946, pages 118, 127.

"Chemical Engineers' Handbook," Third Edition, McGraw-Hill Book Co., Inc., 1950, page 901.

Hassler: "Active Carbon," published by the Chemical Publishing Co. Inc., Brooklyn, N.Y. (1951), pages 156–159 and 361.